United States Patent [19]

Coppa et al.

[11] Patent Number: 4,662,744
[45] Date of Patent: May 5, 1987

[54] METHOD OF AND APPARATUS FOR MEASURING TRANSVERSE MOMENTS OF AN ELECTROMAGNETIC FIELD ASSOCIATED WITH AN OPTICAL BEAM

[75] Inventors: Gianni Coppa, Asti; Pietro Di Vita, Turin, both of Italy

[73] Assignee: Cselt - Centro Studi e Laboratori Telecomunicazioni SpA, Turin, Italy

[21] Appl. No.: 779,083

[22] Filed: Sep. 20, 1985

[30] Foreign Application Priority Data

Dec. 10, 1984 [IT] Italy .............................. 68224 A/84

[51] Int. Cl.$^4$ ........................................... G01N 21/00
[52] U.S. Cl. .................................................. 356/73.1
[58] Field of Search ............... 356/73.1; 250/281, 300, 250/299

[56] References Cited

U.S. PATENT DOCUMENTS 4,472,630  9/1984  Schoen ................................. 250/281

OTHER PUBLICATIONS

Article entitled "Fourth International Conference on Integrated Optics and Optical Fiber Communication", Jun. 27-30, 1983, pp. 40-41.
Electronic Letters—11, Dec., 1981—vol. 17, No. 25, pp. 958-960.
Electronic Letters—25, Jun., 1981—vol. 17, No. 13, pp. 458-460.

Primary Examiner—Gene Wan
Attorney, Agent, or Firm—Karl F. Ross; Herbert Dubno

[57] ABSTRACT

A method and an apparatus wherein a light beam is passed through a slit oscillating with respect to the beam, and a periodic signal is obtained from the beam portion traversing the slit. The periodic signal is split into its spectral components. Moment values are derived from the values of the amplitudes of such components.

12 Claims, 3 Drawing Figures

METHOD OF AND APPARATUS FOR MEASURING TRANSVERSE MOMENTS OF AN ELECTROMAGNETIC FIELD ASSOCIATED WITH AN OPTICAL BEAM

FIELD OF THE INVENTION

The present invention relates to a method of and to an apparatus for optical measurement and, more particularly, for measuring the transverse moments of an electromagnetic field associated with an optical beam.

Preferably, but not exclusively, the invention can be applied to spot size evaluation in an optical fiber, i.e. to measurement of the 2nd order moment of the near or far output field of such a fiber.

BACKGROUND OF THE INVENTION

It is known that the generic n-th order moment (n being an integer and positive number) of the electromagnetic field of an optical beam is given by the relation:

$$M_n = \frac{\int_0^{2\pi} d\phi \int_0^\infty r^n I(r) \, rdr}{\int_0^{2\pi} d\phi \int_0^\infty I(r) \, rdr} \quad (1)$$

where $I(r)$ is the near field or far field beam intensity at a distance r from the axis.

More particularly, the square root $W_0$ of the 2nd order moment, i.e. the root mean square of the spatial distribution of the electromagnetic field of the beam (or of the field at the output of an optical fiber, in the preferred application) represents the beam spot-size.

The knowledge of $W_0$ is important for the knowledge of the geometric dimensions of the field, which gives information both as to the collimation of and as to the power distribution in the beam.

In the particular case of optical fibers (to which reference will be made hereinafter since the invention has been mainly developed for applications in that domain), spot-size data provides information on propagation within the fiber and on splice losses; such information is indispensable when using optical fibers in a telecommunications system. Even more particularly, spot-size $W_0$ both in the near and in the far field characterizes the properties of monomode fibers; in fact for such fibers splice and bending losses, and cabling losses due to microbending, can be obtained from these parameters. The variation of spot-size with wavelength indicates the cut off wavelength of the first higher order mode, as well as the fiber dispersion.

A number of different techniques have been proposed for spot-size measurements in optical fibers.

One is described by R. Yamauchi, T. Murayama, Y. Kikuchi, Y. Sugawara and K. Inada in the paper "*Spot-Sizes of Single Mode Fibres With a Noncircular Core*" presented at the Fourth International Conference on Integrated Optics and Optical Fibre Communication (IOOC'83, Tokyo, Japan, June 27-30, 1983, Paper 28A2-3, pages 39 and ff.). In this method, spot size is obtained by determining the value of I at the fiber output by near field intensity scanning and then by directly applying relation (1), with n=2. This method can be used for measuring moments of any order. Since the integration interval extends to infinity, but, beyond a certain distance from the beam axis, intensity I will be masked by measurement noise, the method can introduce some significant errors into the value obtained. In addition, radial scanning is inherently complex.

According to other methods a Gaussian distribution is assumed for the function representing I and quantities are measured which can be correlated to spot size by means of formulae, which are valid only if the hypothesis of a Gaussian field is satisfied. Examples of such methods are described in the papers: "*Direct Method of Determining Equivalent-Step-Index Profiles for Multimode Fibres*" by C. A. Millar, Electronics Letters, Vol. 17, No. 13, June 25, 1981, pp. 458 and ff., and "*Fundamental Mode Spot-Size Measurement in Single-Mode Optical Fibres*" by F. Alard, L. Jeunhomme, P. Sansonetti, Electronics Letters, Vol. 17, N. 25, Dec. 10, 1981, pp. 958 and ff. Since the hypothesis of Gaussian field applies only in very particular cases, the measurements obtained by these methods present an intrinsic uncertainty which is difficult to quantify.

OBJECT OF THE INVENTION

Is is an object of the invention to overcome these disadvantages and provide a method allowing the accurate determination of transverse moments of any order and, in particular, of the spot-size, with no need for complicated measurements requiring radial scanning of the beam intensity, nor numeric computation of integrals, nor application of approximation hypotheses as to field distribution.

SUMMARY OF THE INVENTION

These objects are attained, based upon the cosideration that usually in measurements on optical beams the signal emitted from the source is modulated and only the electrical signal component at a frequency equal to the modulation frequency is extracted by measurement instruments.

More particularly, we have established that the beam moments depend on the higher harmonics of a periodic signal obtained by a suitable scanning of the modulated signal.

According to the invention the beam is passed along an optical path in a propagation direction and is partly intercepted by a screen elongated in a direction perpendicular to the propagation direction. The beam and screen are relatively displaced in an oscillating manner in a direction perpendicular to the propagation direction and the elongation direction of the slit so that the intensity distribution of the portion of the beam traversing the slit varies at a frequency of the relative displacement.

The intensity of the portion of the beam traversing the window is measured and corresponding thereto a periodic electric signal is generated which consists of pulses occurring at the frequency of the relative displacement and with an amplitude and shape dependent upon the intensity distribution. The periodic signal is sampled at intervals equal to twice the period of the signal and for a time interval equal to a pulse duration, thereby generating a sampled periodic signal having half the frequency of the relative oscillatory displacement.

The sampled periodic signal is split into spectral components and the amplitude values of these spectral components are fed to the computing system which derives moment values from the measured amplitude values and can output a calculation of the spot size utilizing the principles previously described.

To effect the relative displacement, the output end of the optical fiber can be vibrated or the screen can be vibrated or a cylindrical lens interposed between the output end of the optical fiber and the screen can be vibrated, this lens having its axis parallel to the slit and passing a beam of a diameter substantially equal to the slit width.

BRIEF DESCRIPTION OF THE DRAWINGS

For a better understanding reference is made to the annexed drawing in which.

SPECIFIC DESCRIPTION

Figure 1:
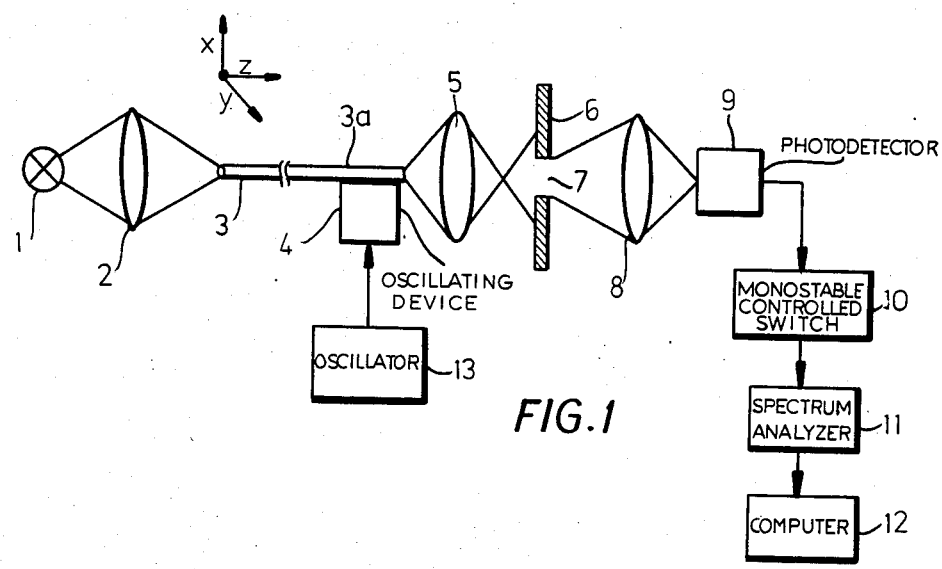
FIG. 1 shows an apparatus according to the invention for carrying out measurements on a beam outgoing from a fiber.

In the drawing electrical connections are represented in heavy lines. In FIG. 1 light from a source 1 is concentrated by a suitable optical system 2 (e.g. a microscope objective) at the input end of a fiber 3. Fiber end portion 3a comprising the output face, is mounted on a device 4 which makes it oscillate orthogonally to its axis. Device 4 can be an electro-acoustical transducer or a piezoelectric device, and is connected to a generator 13 of oscillations at the frequency desired for the fiber-end motion.

This frequency can range for instance between tens and thousands of MHz, depending on the features of the measurement electronics.

The light leaving fiber 3 is collected by a second optical system 5 which forms an image of the fiber output face on a screen 6. The screen 6 has a longitudinal slit 7 extending in the y direction, perpendicular to the directions of oscillation x and of propagation z; owing to the oscillation of fiber 3 the image oscillates at the same frequency and thus slit 7 localizes instant by instant different portions of the image. The light passing through slit 7 is collected by a further optical system 8 by which it is focused on a photodetector 9.

The photodetector output signal is a periodic signal, consisting of pulses having a frequency equal to the oscillation frequency and a shape depending on field distribution. This output signal is fed to a circuit 10 which eliminates its even pulses. Such circuit can consist e.g. of a monostable with high input impendance controlling an analog switch placed in series. The signal outgoing from circuit 10 is sent to a spectrum analyzer 11 or another equivalent device supplying the various spectral components of the signal, which depend on the field moments, as will be seen hereinafter. A computing system 12 computes the values of such moments and more particularly the spot size.

By eliminating optical system 5, i.e. by collecting the beam outgoing from fibre 3 direct on screen 6, the described apparatus can be used for far-field moment measurements.

Mathematical considerations whereupon the invention is based will be now explained, supposing for sake of simplicity that the beam has a radial symmetry.

If the fiber-end portion oscillates according to the law $x = A \cdot \sin \omega T$ (with $\omega = 2\pi f$), indicating by $I(x,y)$ the intensity (in the near or far field as the case may be) of the radiation outgoing from the fiber, and by s the slit width, the intensity of the radiation outgoing from the slit 15 (with good approximation, where s is rather small) is $$I'(x) = s \int_{-\infty}^{\infty} I(x,y) \, dy,$$

the signal outgoing from photodetector 9 will be $V(t) = K\, I'(x) = K\, I'(A\,\sin \omega t)$, K being a proportionality constant.

Since I has radial symmetry, function $I'(x)$ is clearly an even function and signal V(t) can be represented by the following Fourier series $$V(t) = \sum_{n=0}^{\infty} V_n \cos n\omega t \quad . \tag{2}$$

where coefficients $V_n$ are given by relations:

$$V_n = \frac{\int_{-T/4}^{T/4} V(t) \cos n\omega t \, dt}{\int_{-T/2}^{T/2} \cos^2 n\omega t \, dt} \tag{3}$$

$T = 2\pi/\omega$ being the period of signal V(t).

The integral at the numerator of (3) is calculated between $-T/4$ and $T/4$, since the presence of device 10 makes V(t) null in the intervals between $-T/2$ and $-T/4$ and between $T/4$ and $T/2$.

By computing the denominator of (3) and passing from integration variable t to spatial variable x, the following relations are obtained for V1, V3:

$$V1 = \frac{2k}{T} \int_{-T/4}^{T/4} I'(x) \cos \omega t \, dt = \frac{k}{\pi A} \int_{-A}^{A} I'(x) \, dx \tag{4}$$

$$V3 = \frac{2k}{T} \int_{-T/4}^{T/4} I'(x) \cos 3 \omega t \, dt = \tag{5}$$

$$\frac{2k}{T} \int_{-T/4}^{T/4} I'(x)(1 - 4 \, sen^2 \omega t) \cos \omega t \, dt =$$

$$\frac{k}{\pi A} \int_{-A}^{A} I'(x)\left(1 - \frac{4x^2}{A^2}\right) dx = V1\left(1 - \frac{4 <x^2>}{A^2}\right)$$

where $<x^2>$ indicates the expression $\int I'(x)x^2 dx / \int I'(x)dx$

It is easily deduced that:

$$<x^2> = A^2 \frac{V1 - V3}{4 V1} \tag{6}$$

and, taking into account that the field distribution in the two directions x,y is identical, $$<r^2> = 2 <x^2> = A^2 \frac{V1 - V3}{2V1} \tag{7}$$

where $<r^2> = \int I(r) r^2 dr / \int I(r) dr$

It is immediate to pass from these relations to those valid for the most general case, expressed by (1), substituting values $r \cos \phi$ and $r \sin \phi$ for x and y. $W_o$ is immediately obtained from value $<r^2>$.

To obtan higher order moments, the harmonics of V(t) higher than the third one are to be considered. More particularly, to obtain the 4th order moment, V5 is to be determined, which depends on $<x^4>$ according to relation:

$$V5 = \frac{2k}{T} \int_{-T/4}^{T/4} I'(x) \cos 5\omega t \, dt = \tag{8}$$

$$\frac{2k}{T} \int_{-T/4}^{T/4} I'(x)(1 - 12\sin^2 \omega t + 16\sin^4 \omega t) \cos \omega t \, dt =$$

$$V1 \left(1 - \frac{12 <x^2>}{A^2} + \frac{16 <x^4>}{A^4}\right)$$

wherefrom $$<x^4> = \frac{V5 - 3 V3 + 2 V1}{16 V1} A^4 \tag{9}$$

Taking into account that $x = r \cos \phi$, it is simple to show that $<r^4> = 8/3 <x^4>$.

To carry out the measurements with the described device, screen 6 is located so that slit 7 is at the centre of the near or far field image. Generator 13 is then energized: the image displaces with respect to the slit and the portion localized by the slit is collected by the photodetector and supplied through circuit 10 to spectrum analyser 11, which supplies the values of V1, V3, V5 .... From said values computing system 12 obtains the spot size and the values of any other desired moment, by applying the relations above.

Figure 2:
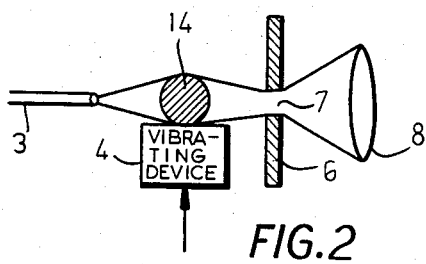
FIGS. 2 and 3 are partial vew of two alternatives.

It is evident that what described has been given only by way of non-limiting example and that modifications and variations are possible without going out of the scope of the invention. More particularly, vibrating device 4 can be associated with screen 6 instead of being associated with the end portion of fiber 3; for near field measurements, device 4 can be associated with a cylindrical lens 14 (FIG. 2), which is placed between fiber 3 and the screen, and lets through a beam whose diameter basically corresponds to the width of slit 7. The lens can consist of an optical fibre trunk.

Figure 3:
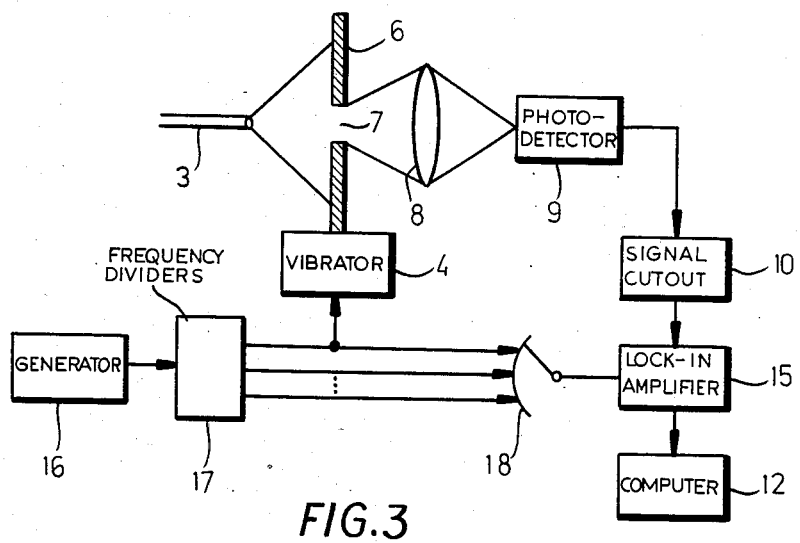

In a variant of the measurement device, shown in FIG. 3, the spectrum analyzer can be replaced by a lock-in amplifier 15. Such amplifier needs for its operation a signal with the same frequency as the harmonic of V(t) whose value is being calculated: generator 13 will be replaced in this case by a generator 16 at frequency N. f (with N maximum order of the moment to be measured) associated with suitable frequency dividers, schematized by block 17 and supplying signals with frequency f, 3f, 5f .... A switch 18 allows amplifier 15 to be fed with the signal necessary for the measurement. It is to be noted that the arrangement of screen 6 shown in FIG. 3 is that necessary to far field measurements and that transducer 4 has been shown associated with screen 6.

For measurements on a beam not guided by a fiber, screen 6 or optical system 5 will directly collect the light emitted from source 1.

We claim:

1. A method of measuring a transverse moment of an electromagnetic field associated with an optical beam, comprising the steps of:
   passing said beam along an optical path in a propagation direction;
   intercepting said beam with a member formed with a window which is elongated in a direction perpendicular to said beam so that only a portion of the beam cross section is permitted to traverse said window;
   relatively displacing said beam and said member oscillatorily in a direction perpendicular to said propagation direction and the direction of elongation of said window so that the intensity distribution of said portion of said beam traversing said window varies at a frequency of the relative oscillatory displacement;
   measuring the intensity of said portion of said beam traversing said window and generating from the measurement a periodic electrical signal consisting of pulses which occur at said frequency and with an amplitude and shape dependent upon said intensity distribution;
   sampling said periodic signal at intervals equal to twice the period of said signal and for a time interval equal to a pulse duration, thereby generating a sampled periodic signal having half the frequency of the relative oscillatory displacement;
   splitting said sampled periodic signal into spectral components;
   measuring amplitude values of said spectral components; and
   deriving moment values from the measured amplitude values.

2. The method defined in claim 1 wherein the step of passing said beam along said optical path includes propagating said beam through a monomode optical fiber, further comprising the step of determining said spot size from the derived moment values.

3. The method defined in claim 1 wherein said window is a slit, further comprising the step of transmitting said beam to said slit through a cylindrical lens having an axis parallel to the slit and emitting a beam with a diameter substantially corresponding to the width of said slit.

4. The method defined in claim 1 wherein said beam is passed along said path by propagating said beam through an optical fiber having an end portion terminating ahead of said window in said propagation direction, the relative oscillatory displacement being obtained by vibrating said end portion.

5. The method defined in claim 1 wherein said member is a screen formed with a slit constituting said window, the relative oscillatory displacement being obtained by vibrating said screen in a plane of the screen which is perpendicular to said propagation direction.

6. The method defined in claim 3 wherein said relative oscillatory displacement is obtained by vibrating said lens.

7. An apparatus for measuring a transverse moment of an electromagnetic field associated with an optical beam comprising:
   means for generating an optical beam and passing said beam along an optical path in a propagation direction;
   a member positioned along said path for intercepting said beam and formed with a window which is elongated in a direction perpendicular to said beam so that only a portion of the beam cross section is permitted to traverse said window;
   means for relatively displacing said beam and said member oscillatorily in a direction perpendicular to said propagation direction and the direction of elongation of said window so that the intensity varies at a frequency of said relative oscillatory displacement;

means for converting said portion of said light beam into an electrical signal for measuring the intensity of said portion of said beam traversing said window and generating from the measurement a periodic electrical signal consisting of pulses which occur at said frequency and with an amplitude and shape dependent upon said intensity distribution;

means connected to said converting means for sampling said periodic signal at intervals equal to twice the period of said signal and for a time interval equal to a pulse duration, thereby generating a sampled periodic signal having half the frequency of the relative oscillatory displacement;

means connected to said sampling means for splitting the periodic signal into spectral components and for supplying amplitude values of said spectral components; and a computing system connecting to said sampling means for deriving moment values from the measured amplitude values.

8. The apparatus defined in claim 7 wherein said means for passing said beam along said optical path includes a monomode optical fiber located between said generating means and said member, said member being a screen formed with a slit, said splitting means being constructed and arranged for supplying said computing system with amplitude values and a fundamental one of said components and a third harmonic component whereby said computing system is constructed to obtain from said amplitude values of said fundamental and third harmonic components a measurement of spot size of a beam traversing said fiber.

9. The apparatus defined in claim 8, further comprising a cylindrical lens between an end portion of said fiber and said screen, said cylindrical lens having an axis parallel to said slit and passing to said slit a beam with a diameter substantially corresponding to the width of said slit.

10. The apparatus defined in claim 9 wherein said means for relatively displacing said beam and said member includes means for vibrating said lens.

11. The apparatus defined in claim 8 wherein said means for relatively displacing said beam and said member includes means for vibrating said screen.

12. The apparatus defined in claim 8 wherein said means for relatively displacing said beam and said member includes means for vibrating an end portion of said fiber proximal to said screen.

* * * * *